J. C. HANSON.
WINDMILL.
APPLICATION FILED MAR. 28, 1910.
989,705.
Patented Apr. 18, 1911.
3 SHEETS—SHEET 2.
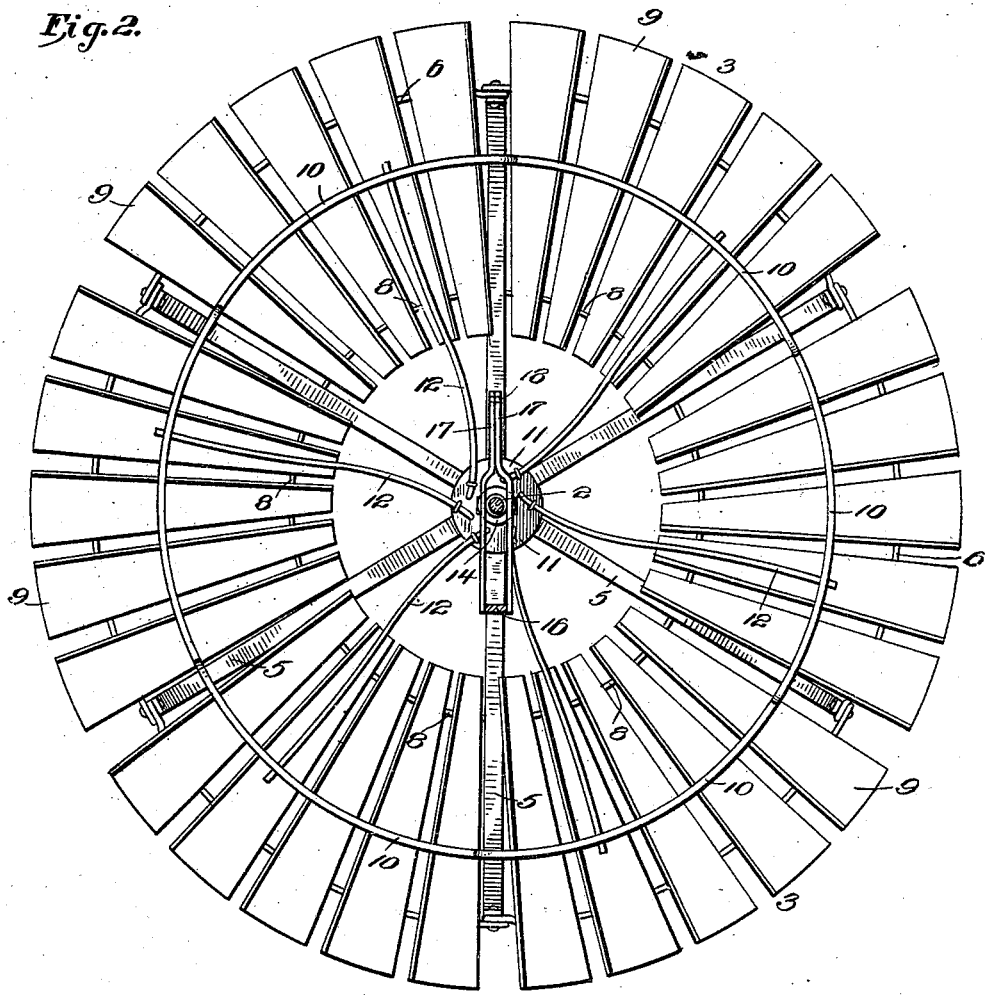
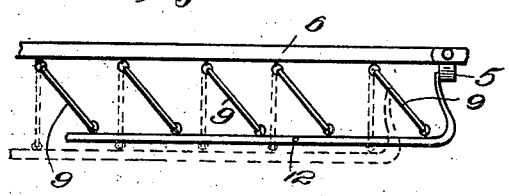
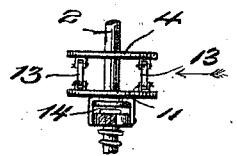
Witnesses
G. F. Tolson
C. H. Griesbauer
Inventor
J. C. Hanson
by H. B. Willson & Co.
Attorneys

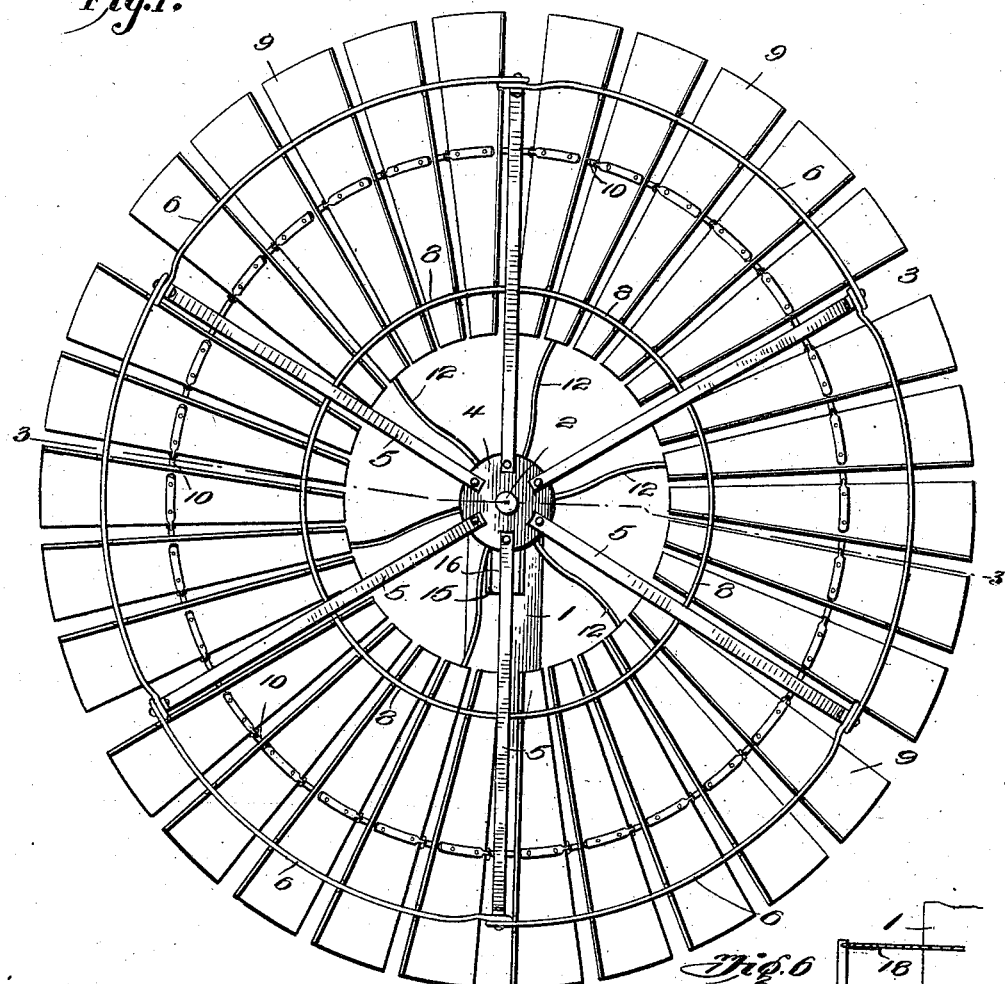
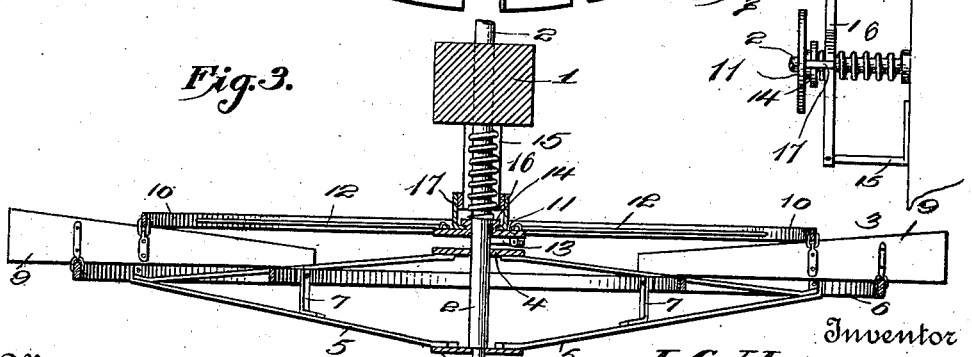

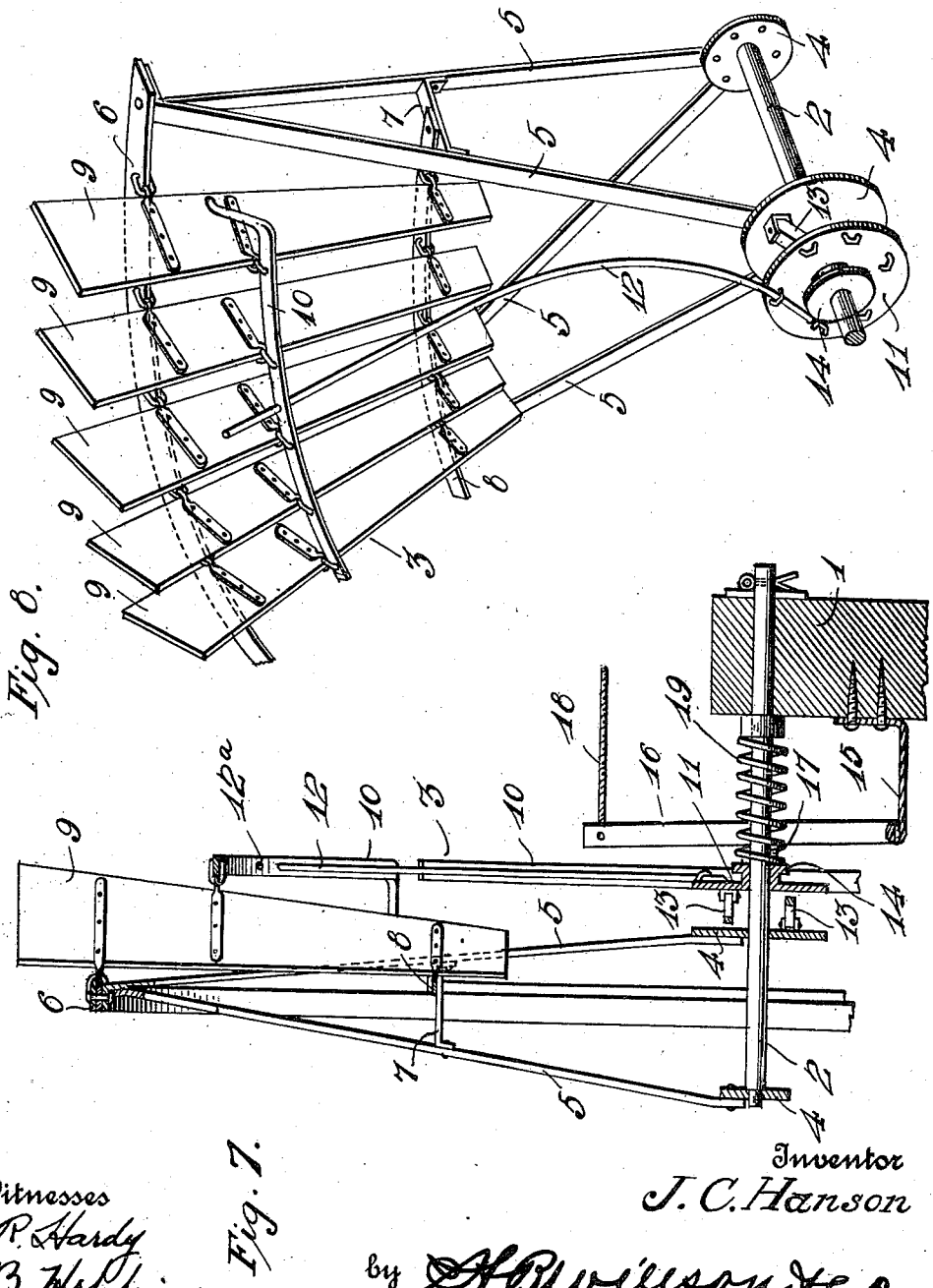

UNITED STATES PATENT OFFICE.

JAMES C. HANSON, OF BAYARD, NEBRASKA.

WINDMILL.

989,705.

Specification of Letters Patent.  Patented Apr. 18, 1911.

Application filed March 28, 1910. Serial No. 552,062.

*To all whom it may concern:*

Be it known that I, JAMES C. HANSON, a citizen of the United States, residing at Bayard, in the county of Morrill and State of Nebraska, have invented certain new and useful Improvements in Windmills; and I do declare the following to be a full, clear, and exact description of the invention, such as will enable others skilled in the art to which it appertains to make and use the same.

This invention relates to vertical wind mills, and the object of the invention is to provide simple and efficient means whereby the blades of the wheel will automatically adjust themselves to the force of the wind so that the wheel will revolve at a predetermined velocity whatever may be the strength of the wind, and under an excessive force of air currents the blades will present their edges to the wind so that the wheel will be out of commission until the wind again subsides.

A further object of the invention is to provide means whereby the wheel may be manually adjusted to an inoperative position without affecting the automatic governing mechanism.

These objects and such other objects as will hereinafter incidentally appear are attained in the use of the apparatus illustrated in the accompanying drawings, and the invention consists in certain novel features of the same, as will be hereinafter first fully described and then more particularly pointed out in the appended claims.

In the drawings, Figure 1 is a front elevation of a vertical wind wheel equipped with my improvements; Fig. 2 is a rear elevation of the same; Fig. 3 is a horizontal section taken on the line 3—3 of Fig. 1; Fig. 4 is a detail edge view of a portion of the wheel; Fig. 5 is a detail view taken longitudinally of the wind wheel shaft, and showing the connection between the hub of the wheel and the slidable governor disk; Fig. 6 is a detail view of the manually operated lever by which the governor disk is shifted upon the wind wheel shaft; Fig. 7 is a central vertical section of the wheel; and Fig. 8 is a detail perspective view of a portion of the wheel showing more clearly the automatic governing devices.

In carrying out my present invention, I employ a wind wheel tower 1 which may be of any preferred design and, for convenience, is indicated in the present drawings in a merely conventional manner as will be readily understood. The wind wheel shaft 2 is mounted in suitable bearings at the upper end of the tower 1, and on the outer or front end of the shaft I mount the wind wheel 3 which consists of a pair of hub disks 4 rigidly secured to the shaft, and a series of spokes 5 secured to said disks and radiating therefrom, the said spokes being connected at their outer ends by a rim or annular band 6 and being connected and braced intermediate their ends by struts 7. To the struts 7, and disposed between the spokes, I secure a ring 8 to the rear edge of which I hinge the blades 9, the said blades being also hinged to the rear edge of the rim or band 6, as clearly shown in Figs. 3 and 7.

The blades are arranged in groups between successive spokes and the blades of each group are connected by a segmental bar 10 hinged to the inner edges of said blades and having one end turned inward, as shown most clearly in Figs. 4 and 8, so as to normally engage the spokes adjacent thereto, and thereby hold the blades at the proper angle to the vertical plane of the wheel to secure the best results under the force of wind normally existing at the place where the wheel is set up. The segmental bars are provided with openings, in which are engaged the upper ends of spring rods 12 which have their inner ends secured to an adjusting or governor disk 11 which is slidably mounted on the wind wheel shaft in rear of the wheel, as shown and as will be readily understood. These spring rods 12 are so disposed as to tend to move the segmental bars in that direction necessary to bring the inturned ends of said bars against the spokes, as shown in full lines in Fig. 4. In this position the blades will be disposed at an angle to the plane of the wheel and, therefore, across the path of the wind blowing against the same, so that the air currents will act on the wheel to rotate the same. Should, however, the wind attain an excessive velocity, the increased force of the same will overcome the tension of the spring rods and consequently throw the blades to the position shown in dotted lines in Fig. 4, in which their edges are presented to the wind, and consequently the wheel will remain at rest. By placing the said spring rods under different degrees of tension the wheel may be adjusted to any desired wind force. It will be understood, of course, that the outer ends of the spring rods are not secured rigidly to the segmental bars, but will have a sliding engagement with the openings therein so that they will readily accommodate themselves to the different positions assumed by the said bars in adjusting the blades to the wind.

The adjustable governor disk 11 is connected to the rear or inner hub disk 4 by links 13 disposed at diametrically opposite points and having their opposite ends pivoted respectively to the hub disk and to the governor disk, as shown in Fig. 5. These links permit the governor disk to move to and from the hub while at the same time limiting the said movement so as to prevent said disk moving rearwardly to such an extent as to disengage the spring rods from the segmental bars or to otherwise affect the adjustment or operativeness of the parts. The governor disk is held toward the hub by a spring 19 coiled around the shaft 2, between the tower and the said disk, so as to hold the spring rods normally in a vertical plane in rear of the wind wheel so that the torsion or resiliency of said rods will be exerted entirely in a line longitudinally of the segmental bars. Secured upon the tower, adjacent the wind wheel shaft, is a bracket 15, to the end of which is pivoted a lever 16 which is slotted to fit around the shaft and extend above the same, its upper end being secured to a chain or cable 18, which extends over suitable guides in the tower and thence down to the ground where it may be manually manipulated to operate said lever. The lever is connected by links 17 to the adjustable governor disk so that the movement of the lever will be transmitted directly to the disk, the preferable form of engagement between the links and the disk being a grooved collar 14 on the disk in which the ends of the links may be engaged as clearly shown in the drawings.

It is thought the operation and advantages of my improved wind wheel will be readily understood and appreciated from the foregoing description taken in connection with the drawings. As before stated, the tension of the spring rods is exerted to hold the blades normally at an angle to the path of the wind so that the wheel will be actuated when the wind is blowing and the brake of the mill is released. Should it be desired to throw the wheel out of commission to permit of repairs or for other purposes, the cable 18 may be drawn downward and the lever 16 thereby pulled rearward so as to slide the governor disk 11 inward or rearward against the tension of the spring 19 so that the several spring rods will be drawn rearward and will thereby be caused to swing the segmental bars away from the respective spokes of the wheels and consequently turn the blades so that they will present their edges to the wind. When the force of the spring 19 cable is released, the force of the spring 19 and of the several spring rods will instantly return the blades to their normal operative position. Should the wind assume an excessive velocity the increased force of the same will overcome the tension of the spring rods and the blades will then automatically present their edges to the wind as before stated and as will be readily understood.

It will be readily seen that my device is composed of very few parts so that liability of the same to get out of order is reduced to a minimum and the making of repairs is greatly facilitated.

Having thus described my invention, what I claim is:—

1. In a wind mill, the combination of a shaft, a wheel frame secured thereto, a plurality of blades hinged at their front edges to the rear side of the wheel frame, segmental bars hinged to the rear ends of the blades and connecting the same in groups, each of said bars having one end bent inwardly to pass between the ends of two adjacent groups of blades in position to engage the wheel frame, and spring rods each having its inner end connected with the shaft and its outer end engaged in a segmental bar to normally hold the forwardly bent end of said bar against the wheel frame.

2. In a wind mill, the combination of a shaft, a wheel frame secured thereto, a plurality of blades hinged at their front edges to the rear side of the wheel, segmental bars hinged to the rear edges of the blades and connecting the same in groups, each of said bars having an opening therethrough and having one end bent inwardly to pass between the ends of two adjacent groups of blades in position to engage the wheel frame, and spring rods each having its inner end connected with the shaft and its outer end engaged with an opening in the segmental bar to normally hold said bar in engagement with the wheel frame.

3. In a wind mill, the combination of a shaft, a wheel frame secured thereto, a plurality of blades hinged at their front edges to the rear side of the wheel frame, segmental bars hinged to the rear edges of the blades and connecting the same in groups, each of said bars having one end bent inwardly to pass between the ends of two adjacent groups of blades in position to engage the wheel frame, spring rods each having its outer end engaged in a segmental bar to normally hold the inwardly bent end of the said bar against the wheel frame, a disk slidably mounted on the shaft and having the inner ends of the spring rods rigidly secured thereto, links connecting said disk with the wheel frame, a spring acting on said disk to hold it normally toward the wheel frame, a lever connected to the disk to move the same in opposition to said spring, and means for operating the said lever.

In testimony whereof I have hereunto set my hand in presence of two subscribing witnesses.

JAMES C. HANSON.

Witnesses:
   E. R. VANATTA,
   E. F. KELLEY.

Copies of this patent may be obtained for five cents each, by addressing the "Commissioner of Patents, Washington, D. C."